United States Patent [19]

Ernst et al.

[11] 4,054,336

[45] Oct. 18, 1977

[54] GUIDE BEARING

[75] Inventors: Horst Manfred Ernst, Eltingshausen; Armin Olschewski, Schweinfurt; Rainer Schürger, Schwanfeld; Lothar Walter, Schweinfurt; Manfred Brandenstein, Aschfeld; Erich Burkl, Stammheim, all of Germany

[73] Assignee: SKF Industrial Trading and Development Company B.V., Nieuwegein, Netherlands

[21] Appl. No.: 663,724

[22] Filed: Mar. 4, 1976

[30] Foreign Application Priority Data

Mar. 22, 1975 Germany .................. 7509224[U]

[51] Int. Cl.² ........................ F16C 19/10; 308 189
[52] U.S. Cl. ................................ 308/233
[58] Field of Search ......... 308/189 R, 193, 194, 233, 308/235, 3 R, 3 A; 192/98, 110 B

[56] References Cited

U.S. PATENT DOCUMENTS

| 2,158,440 | 5/1939 | Spase | 308/233 UX |
| 2,600,347 | 6/1952 | Wagner | 308/233 X |
| 3,068,979 | 12/1962 | Duntov | 308/233 UX |
| 3,525,557 | 8/1970 | Willing | 308/233 |
| 3,920,107 | 11/1975 | Limbacher | 308/233 X |

Primary Examiner—Joseph F. Peters, Jr.
Assistant Examiner—Gene A. Church
Attorney, Agent, or Firm—Daniel M. Rosen

[57] ABSTRACT

A guide bearing for use in motor vehicles, for guiding a power take-off shaft from a clutch disengaging bearing through the borehole formed in a gear box wall. The guide bearing, at the end intended to be fastened to the gear box borehole, carries, within the guide bearing borehole, the outer rolling path for the gear bearing that supports the power take-off shaft of the disengaging clutch in the gear box. On the casing, the guide bearing carries the seating for its attachment in the borehole of the gear box.

10 Claims, 3 Drawing Figures

GUIDE BEARING

BACKGROUND OF THE INVENTION

The present invention relates to a guide bearing for disengaging clutches, particularly for motor vehicles, wherein the guide bearing is fastened at one end to the gear box and carries the axially displaceable release bearing on its casing.

Such guide bearings are generally known. At the gear side end of a typical guide bearing there is a flange, soldered in position. The flange is, in turn, fastened in the bore hole of the clutch housing next to the gear bearing, the gear bearing being fastened in the gear box. Such known guide bearings have the disadvantage that the guide bearing and the gear bearing must be installed separately, one after the other, resulting in a cumbersome assembly and alignment procedure with respect to the guide bearing and the gear bearing. In addition, the manufacture of such guide bearings is expensive and costly, because the guide flange and the outer ring of the gear bearing must, in part, be machined and fitted together.

SUMMARY OF THE INVENTION

The primary object of the present invention is to provide an improved guide bearing, overcoming the aforesaid disadvantages, particularly with respect to assembly and alignment.

It is another object of the invention to provide an improved guide bearing wherein economic manufacture and easy installation of the guide housing at the gear box are made possible.

In accordance with the present invention, the guide bearing, at the end intended to be fastened to the gear box borehole, carries within the guide bearing borehole, the outer rolling path for the gear bearing that supports the power take-off shaft of the disengaging clutch in the gear box. In addition, on its casing, the guide bearing carries the seating for its attachment in the borehole of the gear box. By these means, with a set of rolling bodies built into the guide bearing borehole, as for example a window cage fitted with cylinder rollers, the guide bearing can be completed and built into and fastened in the gear box relatively easily.

In accordance with a specific feature of the present invention, the outer rolling path of the gear bearing is formed directly into the borehole of the guide bearing resulting in the relatively simple manufacture of guide bearing and gear bearing, with fewer constructional units than heretofore realizable.

According to a further characteristic of the present invention, the diameter of the guide bearing is made larger at the end intended to be fastened to the gear box, resulting in a step in the borehole of the guide bearing, at which rolling bodies, such as roller journals, of the gear bearing, and/or shaft packing, arranged in the guide bearing borehole next to the outer rolling path of the gear bearing, can be supported axially.

In other respects, the guide bearing can be manufactured in an economical manner without machining, for example by a cupping method or by extrusion molding. For purposes of fastening the guide bearing to the gear box, a ring flange, in one piece, can be joined to the guide bearing.

Other objects, features and advantages of the present invention will become apparent from the following drawings and are described in greater detail by means of the specific forms of construction.

DETAILED DESCRIPTION

Figure 1:
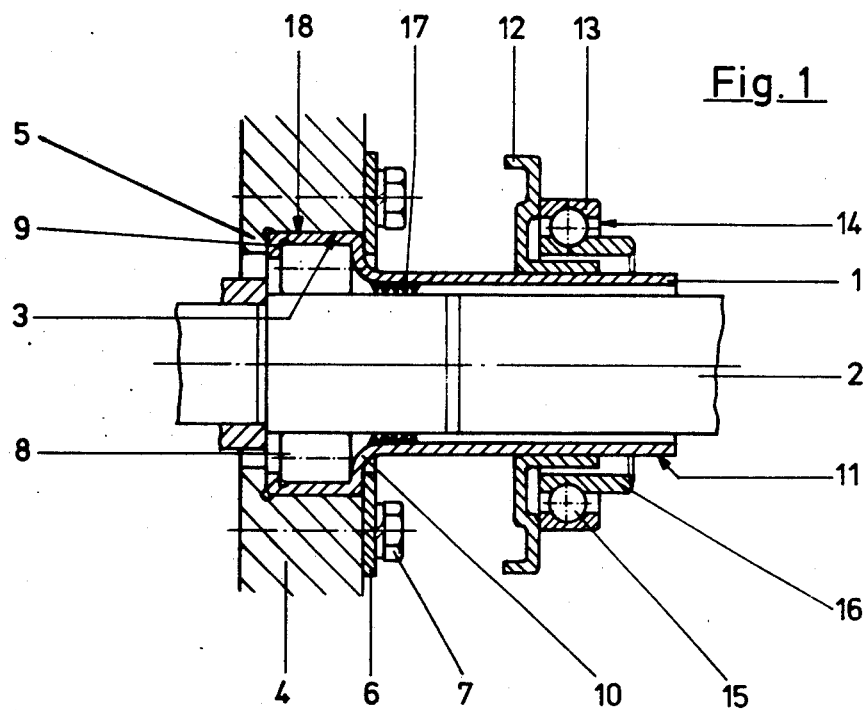
FIG. 1 a cross section through the guide bearing of the present invention.

The present invention is illustrated in FIG. 1, showing a guide bearing 1 having a central borehole through which a power take-off shaft 2 of a disengaging clutch (not shown) is passed. At one end, the guide bearing 1 is seated in the borehole 3 of the gear box 4. The guide bearing 1 is supported laterally against outward movement by the shoulder 5 in the borehole 3 and against inward movement by a ring 6. The ring 6 is firmly connected at its periphery to the wall of the gear box 4 by bolts 7. Cylindrical roll bodies 8, which guide the power take-off shaft 2 radially, run in the guide bearing borehole at the end of the guide bearing 1. The cylindrical roll bodies 8 are maintained axially in the borehole of the guide bearing 1 on their outward side by a flange 9 which is bent radially inwards, and on their inwards side, by a step 10 directed radially inwards. On the casing surface 11 of the other end of the guide bearing 1, a sliding sleeve 12 is arranged in such a way that it is axially displaceable. The sliding sleeve 12 touches the outer ring 13 of the release bearing 14 and, via rolling (e.g., ball) bearings 15, acts to axially displace the inner ring 16 of the release bearing on the guide bearing 1. Between the guide bearing 1 and power take-off shaft 2, a flocked-on seal 17, of known and conventional material and form, is provided, fastened to the guide bearing borehole surface of the guide bearing 1. As a result, the bearing space of the gear bearing 18, formed by the roll bodies 8 and the guide bearing 1, is sealed towards the inside and the lubricant can accordingly be kept in the bearing space.

The inventive guide bearing 1 thus has the advantage that it can be manufactured together with the gear bearing 18 and, as a structural unit, can be supplied with a suitable lubricant, such as grease, thereby resulting in a simple assembly within the borehole 3 of the gear box.

Figure 2:
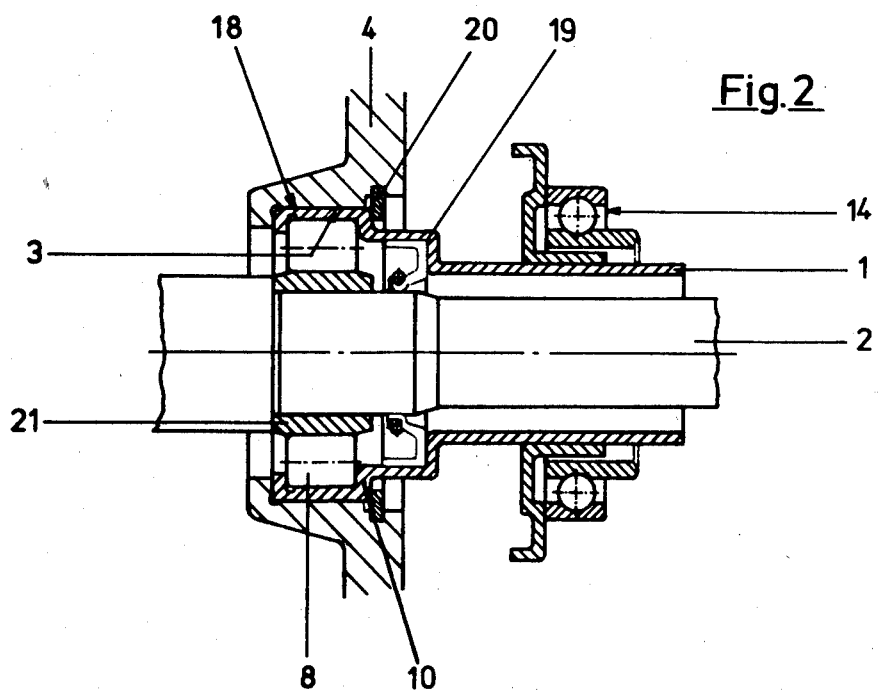
FIG. 2 a cross section through a variation of the guide bearing of the present invention.

In FIG. 2, a modified version of the invention is shown, wherein a radial sealing ring 19, built into the borehole of the guide bearing 1 inwardly of the roll bodies 8, seals the gear bearing 18, formed by the roll bodies 8, towards the inside. The guide bearing 1 is maintained axially in the borehole 3 of the gear box 4 by a circlip 20, which grips behind the exterior of the step 10 of the guide bearing 1. Additionally, the gear bearing 18 is provided with an inner ring 21, fastened on the power take-off shaft 2, as for example by a press fit.

Figure 3:
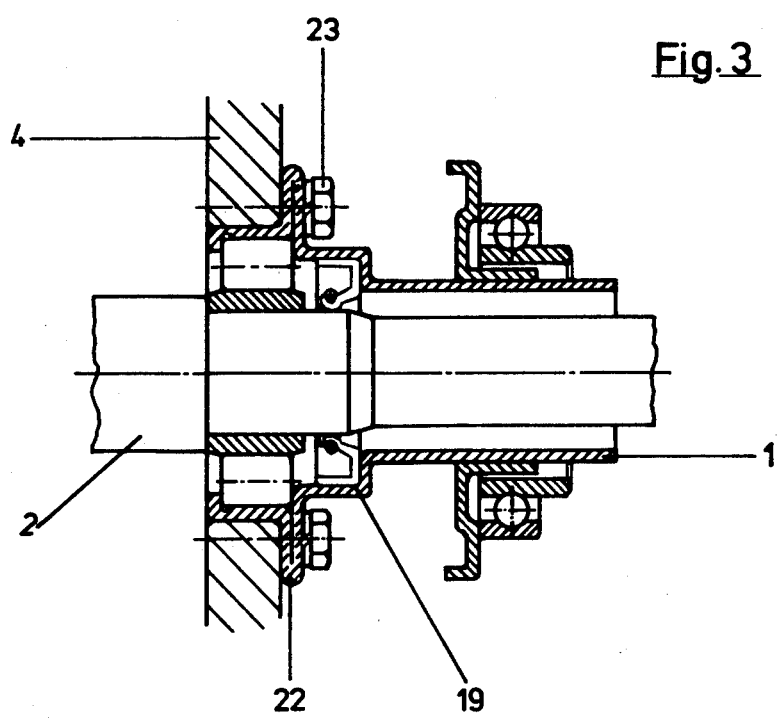
FIG. 3 a cross section through a further variation of the guide bearing of the present invention.

A further modification of the invention is depicted in FIG. 3, wherein the guide bearing 1 has a radial, folded, outwardly directed flange 22, which is fastened to the gear box 4 with bolts 23.

The above-described forms of construction only represent examples which can be changed within the scope of the inventive concept. For example, instead of roll bodies, ball bearings can be inserted in a further borehole in the borehole of the extrusion-molded or deep drawn guide bearing, fitted with a roller path channel.

It is also possible to preform the guide bearing in two parts and then to combine the first part of the guide bearing, which is to be fastened to the gear box, firmly with the corresponding second part of the guide bearing which carries the axially displaceable release bearing. The two parts can be combined with one another by round flanging, wedging over one another, or any other suitable method.

Other variations, modifications, additions or omissions within the scope and spirit of the invention will be apparent to those skilled in the art.

What is claimed is:

1. A guide bearing for guiding a power take-off shaft and for cooperation with a disengaging clutch comprising a casing, seating means for attaching one end of the casing of said guide bearing into a borehole in the wall of a gear box, an axially displaceable release bearing positioned on said casing, said casing forming the outer rolling path of a rolling gear bearing in the end thereof seated in said wall, for supporting said power take-off shaft, the outside of said casing comprising the seating for attaching said casing in said borehole in the wall of said gear box.

2. The guide bearing of claim 1, wherein said guide bearing is formed with an enlarged diameter at the end intended for its attachment to the gear box.

3. The guide bearing of claim 1, further including a shaft packing arranged in the borehole of said guide bearing for sealing said rolling bearing.

4. The guide bearing of claim 1, wherein said guide bearing is deep drawn.

5. The guide bearing of claim 1, wherein said guide bearing is extrusion molded.

6. The guide bearing of claim 1, wherein said guide bearing includes a one piece folded ring flange, for attaching said guide bearing to said wall.

7. The guide bearing of claim 1, wherein said guide bearing comprises two preformed parts, the opposite edges of which are firmly combined with one another.

8. A guide bearing for guiding a shaft through a borehole formed in a wall, said bearing comprising an outer casing, seating means for seating said casing into said wall borehole, said outer casing surrounding rolling elements supporting said shaft, the outer rolling path of said rolling elements being formed on and carried within the inner surface of said casing and located at that portion of said casing carrying said seating means, to form a rolling bearing.

9. The guide bearing of claim 8 wherein said shaft is a power take-off shaft, said wall is a gear box wall, and a release bearing for a clutch disengagement is mounted for axial movement on said casing with respect to the long axis of said guide bearing.

10. The guide bearing of claim 8, wherein said rolling bearing is a cylindrical roller bearing.

* * * * *